US011358655B2

(12) United States Patent
Urban

(10) Patent No.: US 11,358,655 B2
(45) Date of Patent: Jun. 14, 2022

(54) MODULAR TRUCK BED

(71) Applicant: Urban Custom Fabrication, LLC, Pocatello, ID (US)

(72) Inventor: Justin Urban, Pocatello, ID (US)

(73) Assignee: Urban Custom Fabrication, LLC, Pocatello, ID (US)

(*) Notice: Subject to any disclaimer, the term of this patent is extended or adjusted under 35 U.S.C. 154(b) by 173 days.

(21) Appl. No.: 16/900,508

(22) Filed: Jun. 12, 2020

(65) Prior Publication Data

US 2020/0391809 A1 Dec. 17, 2020

Related U.S. Application Data

(60) Provisional application No. 62/861,238, filed on Jun. 13, 2019.

(51) Int. Cl.
| | |
|---|---|
| *B62D 33/02* | (2006.01) |
| *B62D 27/06* | (2006.01) |
| *B62D 33/08* | (2006.01) |
| *B62D 27/00* | (2006.01) |
| *B60Q 1/30* | (2006.01) |

(52) U.S. Cl.
CPC ............. *B62D 33/02* (2013.01); *B62D 27/00* (2013.01); *B62D 33/08* (2013.01); *B60Q 1/30* (2013.01); *B62D 27/06* (2013.01)

(58) Field of Classification Search
CPC .... B62D 25/2054; B62D 27/04; B62D 33/02; B62D 33/08; B62D 53/067; F16B 5/0012; F16B 5/002
See application file for complete search history.

(56) References Cited

U.S. PATENT DOCUMENTS

| | | | | | |
|---|---|---|---|---|---|
| 3,163,461 | A | * | 12/1964 | Troy ................. | B62D 25/2054 105/422 |
| 4,758,128 | A | * | 7/1988 | Law ...................... | B60P 3/122 52/588.1 |
| 4,838,605 | A | * | 6/1989 | Abromavage ..... | B62D 25/2054 105/422 |
| 5,170,605 | A | * | 12/1992 | Huddle ................. | B60P 3/20 52/630 |
| 5,351,990 | A | * | 10/1994 | Thomas .............. | B62D 53/061 280/789 |
| 5,791,714 | A | * | 8/1998 | Hall, Jr. ............. | B62D 25/2054 296/184.1 |

(Continued)

*Primary Examiner* — Gregory A Blankenship
(74) *Attorney, Agent, or Firm* — Kunzler Bean & Adamson; Bruce R. Needham

(57) ABSTRACT

A truck bed member includes a rectangular top side with a long side along a first axis. An interlocking side is fixed perpendicular to the top side along a first edge of the top side parallel to the first axis and includes an interlocking member along an edge opposite the interlocking side coupled to the top side. An interlock receiving side is fixed perpendicular to the top side along a top side second edge opposite the first edge and parallel to the first axis. The interlocking side and the interlock receiving side are parallel to one another and extend a same direction from the top side. The interlock receiving side includes an interlock receiving member along an edge of the interlock receiving side opposite the edge coupled to the top side. The interlocking member is configured to couple to the interlock receiving member of a different truck bed member.

20 Claims, 11 Drawing Sheets

(56) References Cited

U.S. PATENT DOCUMENTS

| | | | | |
|---|---|---|---|---|
| 6,615,894 B1* | 9/2003 | McKeon | | E06B 3/481 |
| | | | | 160/1 |
| 7,181,889 B2* | 2/2007 | Perkowski | | B62D 33/02 |
| | | | | 52/177 |
| 7,575,264 B1* | 8/2009 | Solomon | | B62D 25/2054 |
| | | | | 296/183.1 |
| 9,272,740 B1* | 3/2016 | Portenier | | B62D 33/02 |
| 9,707,905 B2* | 7/2017 | Courtright | | B62D 25/2054 |
| 10,717,472 B2* | 7/2020 | Wiberg | | B62D 33/02 |
| 11,117,628 B2* | 9/2021 | Keen | | B62D 65/024 |
| 2005/0093320 A1* | 5/2005 | Brauer | | B62D 33/0207 |
| | | | | 296/3 |
| 2006/0087152 A1* | 4/2006 | Kuriakose | | B62D 25/2054 |
| | | | | 296/184.1 |
| 2011/0020589 A1* | 1/2011 | Kan | | E04D 3/32 |
| | | | | 428/83 |
| 2011/0233952 A1* | 9/2011 | Kuriakose | | B62D 25/2054 |
| | | | | 411/366.1 |
| 2012/0169087 A1* | 7/2012 | Griffin | | B62D 29/043 |
| | | | | 296/184.1 |
| 2012/0205942 A1* | 8/2012 | Castillo | | B62D 25/2054 |
| | | | | 296/187.11 |
| 2016/0347205 A1* | 12/2016 | Cardone | | B62D 25/2009 |
| 2018/0334195 A1* | 11/2018 | Stojkovic | | B62D 25/2072 |
| 2019/0193794 A1* | 6/2019 | Beet | | B62D 25/2054 |
| 2019/0300075 A1* | 10/2019 | Wiberg | | B62D 29/008 |
| 2020/0079440 A1* | 3/2020 | Keen | | B62D 29/007 |
| 2020/0391809 A1* | 12/2020 | Urban | | B60R 13/01 |
| 2020/0406985 A1* | 12/2020 | Zhu | | B62D 33/0207 |
| 2022/0001940 A1* | 1/2022 | Chumchal | | B62D 33/023 |

* cited by examiner

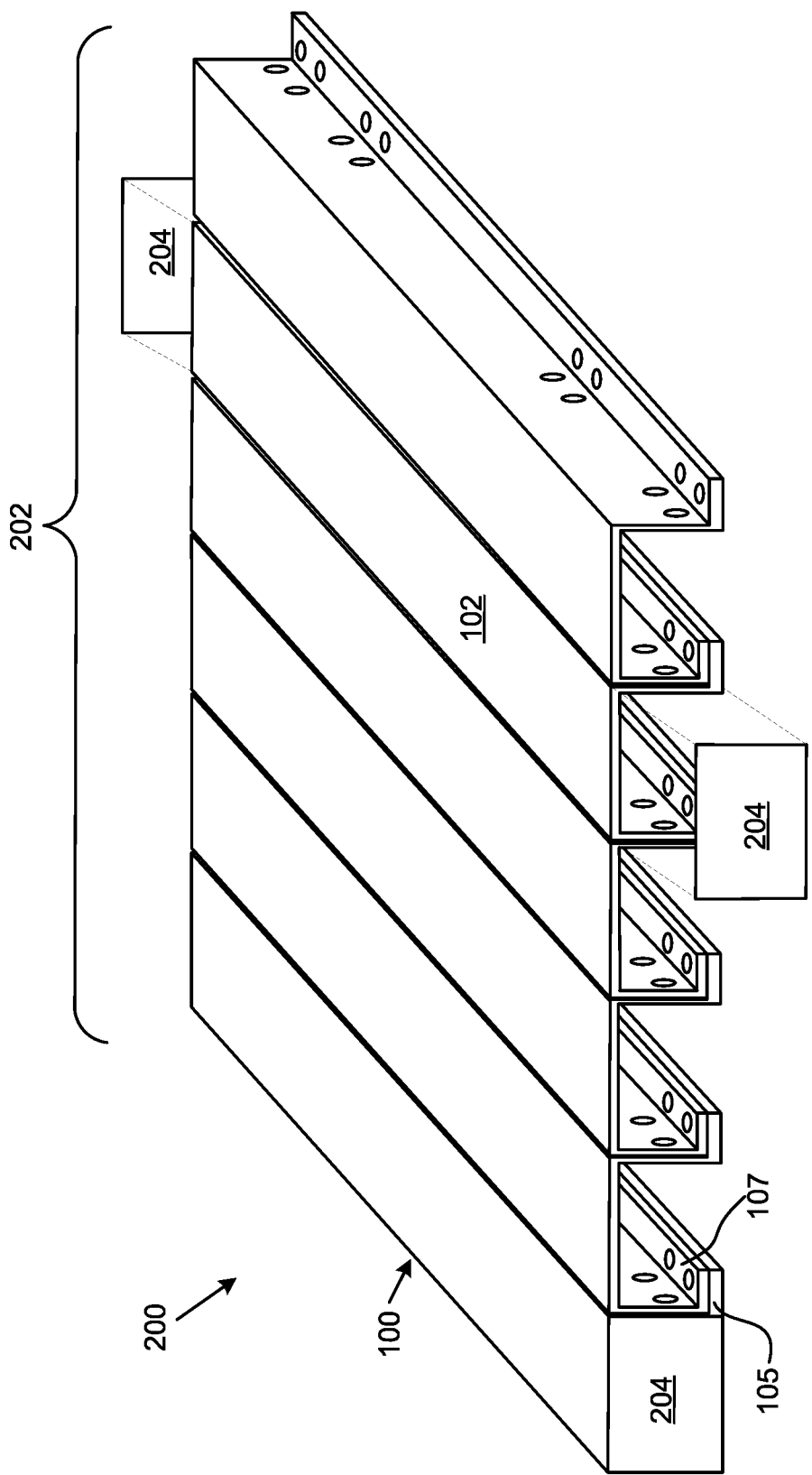

MODULAR TRUCK BED

CROSS-REFERENCES TO RELATED APPLICATIONS

This application claims the benefit of, U.S. Provisional Patent Application No. 62/861,238 entitled "TRUCK BED" and filed on Jun. 13, 2019 for Justin Urban, which is incorporated herein by reference.

FIELD

This invention relates to truck beds and more particularly relates to a modular truck bed system.

BACKGROUND

Typical truck beds for flatbed trucks may be manufactured separately from the trucks and attached to the truck after manufacture. However, typical truck beds are large and difficult to ship.

SUMMARY

A truck bed member includes a top side having a substantially rectangular shape such that a length of the top side along a first axis from a first end to an opposing second end is greater than a width of the top side along a second axis perpendicular to the first axis. The truck bed includes an interlocking side fixed perpendicular to the top side along a length of a first edge of the top side and parallel to the first axis. The interlocking side includes an interlocking member along a length of an edge of the interlocking side opposite the edge of the interlocking side coupled to the top side. The truck bed member includes an interlock receiving side fixed perpendicular to the top side along a length of a second edge of the top side. The second edge is opposite the first edge and parallel to the first axis. The interlocking side and the interlock receiving side are substantially parallel to one another and extending a same direction from the top side. The interlock receiving side includes an interlock receiving member along a length of an edge of the interlock receiving side opposite the edge of the interlock receiving side coupled to the top side. The interlocking member of the interlocking side is configured to selectively couple to the interlock receiving member of the interlock receiving side of a different truck bed member.

A modular truck bed system includes a plurality of truck bed members. Each truck bed member includes a top side having a substantially rectangular shape such that a length of the top side along a first axis from a first end to an opposing second end is greater than a width of the top side along a second axis perpendicular to the first axis. The truck bed members each include an interlocking side fixed perpendicular to the top side along a length of a first edge of the top side and parallel to the first axis. The interlocking side includes an interlocking member along a length of an edge of the interlocking side opposite the edge of the interlocking side coupled to the top side. The truck bed members each include an interlock receiving side fixed perpendicular to the top side along a length of a second edge of the top side. The second edge is opposite the first edge and parallel to the first axis.

The interlocking side and the interlock receiving side are substantially parallel to one another and extend a same direction from the top side. The interlock receiving side includes an interlock receiving member along a length of an edge of the interlock receiving side opposite the edge of the interlock receiving side coupled to the top side. The interlocking member of the interlocking side is configured to selectively couple to the interlock receiving member of the interlock receiving side of a different truck bed member of the plurality of truck bed members. The modular truck bed system includes truck bed substructure. The plurality of truck bed members are coupled to one another and to the truck bed substructure.

Another modular truck bed system includes a plurality of truck bed members where each truck bed member includes a top side having a substantially rectangular shape such that a length of the top side along a first axis from a first end to an opposing second end is greater than a width of the top side along a second axis perpendicular to the first axis. The modular truck bed system includes an interlocking side fixed perpendicular to the top side along a length of a first edge of the top side and parallel to the first axis. The interlocking side includes an interlocking member along a length of an edge of the interlocking side opposite the edge of the interlocking side coupled to the top side.

The modular truck bed system includes an interlock receiving side fixed perpendicular to the top side along a length of a second edge of the top side. The second edge is opposite the first edge and parallel to the first axis. The interlocking side and the interlock receiving side are substantially parallel to one another and extend a same direction from the top side. The interlock receiving side includes an interlock receiving member along a length of an edge of the interlock receiving side opposite the edge of the interlock receiving side coupled to the top side. The interlocking member of the interlocking side is configured to selectively couple to the interlock receiving member of the interlock receiving side of a different truck bed member of the plurality of truck bed members.

The modular truck bed system includes a truck bed substructure with two support members that run substantially perpendicular to the plurality of truck bed members within a plane that is parallel to the plane of the truck bed members. The modular truck bed system includes a tail assembly shaped to couple to a last truck bed member positioned at an end of the truck bed members distal to a cab of the truck. The modular truck bed system includes a headache rack shaped to couple to a first truck bed member positioned at an end of a truck bed members adjacent to a cab of the truck. The plurality of truck bed members are couplable to one another, to the truck bed substructure, to the tail assembly and to the headache rack.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2A is a perspective view illustrating one embodiment of a modular truck bed with a plurality of truck bed members depicted in FIG. 1A;

DETAILED DESCRIPTION

Figure 1A:
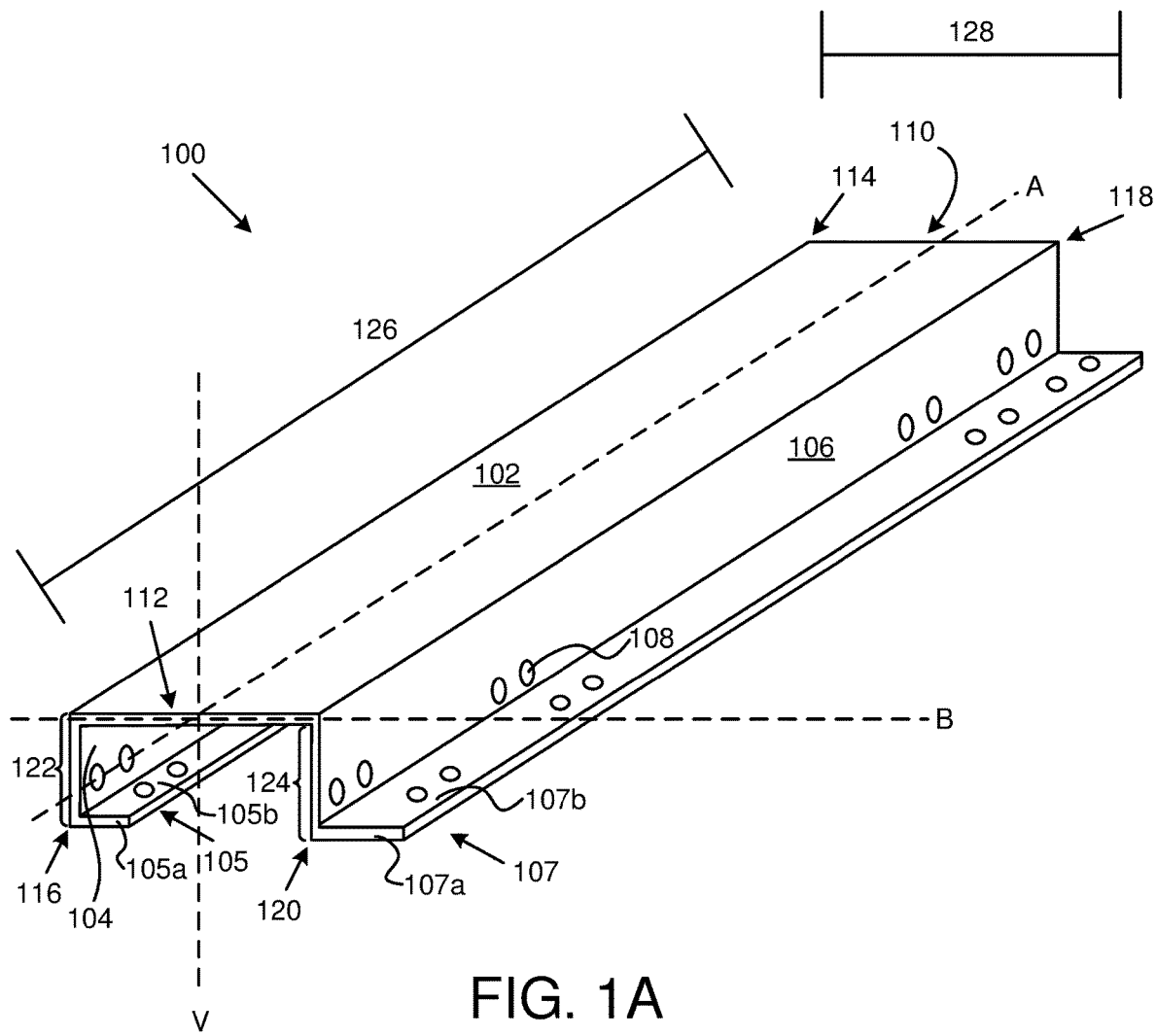
FIG. 1A is a perspective view illustrating one embodiment of a truck bed member of a modular truck bed.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A truck bed member includes a top side having a substantially rectangular shape such that a length of the top side along a first axis from a first end to an opposing second end is greater than a width of the top side along a second axis perpendicular to the first axis. The truck bed includes an interlocking side fixed perpendicular to the top side along a length of a first edge of the top side and parallel to the first axis. The interlocking side includes an interlocking member along a length of an edge of the interlocking side opposite the edge of the interlocking side coupled to the top side. The truck bed member includes an interlock receiving side fixed perpendicular to the top side along a length of a second edge of the top side. The second edge is opposite the first edge and parallel to the first axis. The interlocking side and the interlock receiving side are substantially parallel to one another and extending a same direction from the top side. The interlock receiving side includes an interlock receiving member along a length of an edge of the interlock receiving side opposite the edge of the interlock receiving side coupled to the top side. The interlocking member of the interlocking side is configured to selectively couple to the interlock receiving member of the interlock receiving side of a different truck bed member.

In some embodiments, the interlocking member extends in a direction parallel to the top side and in a direction toward the interlock receiving member and the interlock receiving member extends in the direction parallel to the top side in a direction away from the interlocking member. In other embodiments, the interlocking member has a "J" shape with a horizontal member that is perpendicular to the edge of the interlocking side that is not fixed to the top side and a vertical member that is angled away from a vertical plane towards the interlocking side and the interlock receiving member has a "J" shape that corresponds to the "J" shape of the interlocking member with a horizontal member that is perpendicular to the edge of the interlock receiving side that is not fixed to the top side and a vertical member that is angled away from a vertical plane towards the interlock receiving side such that movement of the interlocking member is prevented in a vertical direction when the interlocking member is inserted into the interlock receiving member.

In some embodiments, the truck bed member includes a plurality of openings in the interlocking side, the interlocking member, the interlock receiving side, and the interlock receiving member. The plurality of openings are configured for receiving fastening members for securing an interlocking member of the truck bed member to an interlock receiving member of the different truck bed member. In other embodiments, the interlocking side has a shorter vertical length than the interlock receiving side such that when the interlocking member of the truck bed member is inserted into the interlock receiving member of a different truck bed member the top sides of the truck bed members are substantially flush along a horizontal plane. In other embodiments, the truck bed member includes end caps fixed to the first and second ends, the interlocking side, and/or the interlock receiving side. In other embodiments, each of the end caps include a plurality of openings positioned to fasten one or more attachments to the end cap with a fastener.

In some embodiments, the truck bed member includes one or more openings along the interlocking member and the interlock receiving member positioned for securing the truck bed member to one of a truck frame and a substructure coupled to a truck frame. In other embodiments, the truck bed member is made of a rigid material.

A modular truck bed system includes a plurality of truck bed members. Each truck bed member includes a top side having a substantially rectangular shape such that a length of the top side along a first axis from a first end to an opposing second end is greater than a width of the top side along a second axis perpendicular to the first axis. The truck bed members each include an interlocking side fixed perpendicular to the top side along a length of a first edge of the top side and parallel to the first axis. The interlocking side includes an interlocking member along a length of an edge of the interlocking side opposite the edge of the interlocking side coupled to the top side.

The truck bed members each include an interlock receiving side fixed perpendicular to the top side along a length of a second edge of the top side. The second edge is opposite the first edge and parallel to the first axis. The interlocking side and the interlock receiving side are substantially parallel to one another and extend a same direction from the top side. The interlock receiving side includes an interlock receiving member along a length of an edge of the interlock receiving side opposite the edge of the interlock receiving side coupled to the top side. The interlocking member of the interlocking side is configured to selectively couple to the interlock receiving member of the interlock receiving side of a different truck bed member of the plurality of truck bed members. The modular truck bed system includes truck bed substructure. The plurality of truck bed members are coupled to one another and to the truck bed substructure.

In some embodiments, the truck bed substructure is couplable to a truck behind a cab of the truck to form a truck bed. Each of the plurality of truck bed members is fastened to the truck bed substructure. In other embodiments, the truck bed substructure includes one or more support members that run substantially perpendicular to the plurality of truck bed members within a plane that is parallel to the plane of the truck bed members. In other embodiments, the truck bed substructure includes flexible material to compensate for unevenness of a truck frame of the truck such that the top sides of the plurality of truck bed members, when assembled and fastened to the substructure, are substantially flush within a horizontal plane.

In some embodiments, the modular truck bed system includes a tail assembly configured to couple to a last truck bed member positioned at an end of the truck bed members distal to a cab of the truck. In other embodiments, the tail assembly includes wiring and lights that integrate into an electrical system for a truck comprising the truck bed. In other embodiments, modular truck bed system includes a headache rack configured to couple to a first truck bed member positioned at an end of a truck bed members adjacent to a cab of the truck. In other embodiments, the headache rack includes an upper section slidably coupled to a lower section where a height of the headache rack is adjustable by sliding the upper section with respect to the lower section and fixing the upper section to the lower section with fasteners to retain the upper section at a desired height.

In some embodiments, the modular truck bed system includes one or more side panels and/or accessories that are configured to couple to ends of the truck bed members. In other embodiments, the plurality of truck bed members includes an end truck bed member. The end truck bed member includes an interlocking member extending parallel to the top surface and toward the interlock receiving member.

Another modular truck bed system includes a plurality of truck bed members where each truck bed member includes a top side having a substantially rectangular shape such that a length of the top side along a first axis from a first end to an opposing second end is greater than a width of the top side along a second axis perpendicular to the first axis. The modular truck bed system includes an interlocking side fixed perpendicular to the top side along a length of a first edge of the top side and parallel to the first axis. The interlocking side includes an interlocking member along a length of an edge of the interlocking side opposite the edge of the interlocking side coupled to the top side.

The modular truck bed system includes an interlock receiving side fixed perpendicular to the top side along a length of a second edge of the top side. The second edge is opposite the first edge and parallel to the first axis. The interlocking side and the interlock receiving side are substantially parallel to one another and extend a same direction from the top side. The interlock receiving side includes an interlock receiving member along a length of an edge of the interlock receiving side opposite the edge of the interlock receiving side coupled to the top side. The interlocking member of the interlocking side is configured to selectively couple to the interlock receiving member of the interlock receiving side of a different truck bed member of the plurality of truck bed members.

The modular truck bed system includes a truck bed substructure with two support members that run substantially perpendicular to the plurality of truck bed members within a plane that is parallel to the plane of the truck bed members. The modular truck bed system includes a tail assembly shaped to couple to a last truck bed member positioned at an end of the truck bed members distal to a cab of the truck. The modular truck bed system includes a headache rack shaped to couple to a first truck bed member positioned at an end of a truck bed members adjacent to a cab of the truck. The plurality of truck bed members are couplable to one another, to the truck bed substructure, to the tail assembly and to the headache rack.

FIG. 1A depicts a perspective view of one embodiment of a truck bed member 100. In one embodiment, the truck bed member 100 includes a top side 102. The top side 102 may have a substantially rectangular shape such that a length 126 of the top side 102 along a first axis A from a first end 110 to the opposing end 112 is greater than a width 128 of the top side along a second axis B, which is perpendicular to the first axis A.

In further embodiments, the truck bed member 100 includes an interlocking side 104 that is fixed perpendicular to the top side 102 along a length of a first edge 114 of the top side 102 parallel to the first axis A. In some embodiments, the interlocking side 104 includes an interlocking member 105 connected along a length of an edge 116 of the interlocking side 104 opposite the first edge 114 of the interlocking side 104 that is coupled to the top side 102. In some embodiments, the interlocking member 105 extends in a direction parallel to the top side 102 and in a direction toward an interlock receiving member 107, which is discussed below.

In certain embodiments, the truck bed member 100 includes an interlock receiving side 106 that is fixed perpendicular to the top side 102 along a length of a second edge 118 of the top side 102, opposite the first edge 114 and parallel to the first axis A such that the interlocking side 104 and the interlock receiving side 106 are substantially parallel to one another. The interlock receiving side 106 includes an interlock receiving member 107 connected along a length of an edge 120 of the interlock receiving side 106 opposite the second edge 118 of the interlock receiving side 106 that is coupled to the top side 102. In some embodiments, the interlock receiving member 107 extends in the direction parallel to the top side 102 in a direction away from the interlocking member 105.

In certain embodiments, truck bed members 100 are configured to connect, couple, or otherwise interlock into one another to form a modular truck bed (e.g., convert a standard pickup truck bed to a flatbed), a truck bed liner, a utility bed, or the like, as described in more detail below, for replacing or converting a standard pick-up truck bed to a flatbed. For instance, the interlocking member 105 of a first truck bed member 100 may slide into or be inserted into an interlock receiving member 107 of a second truck bed member 100. Truck bed members 100, in certain embodiments, are manufactured of a substantially rigid material that can withstand heavy loads, rough conditions, or the like such as steel, stainless steel, carbon fiber, non-carbon materials, aluminum, plastic, or the like.

In various embodiments, truck bed members 100 may have different dimensions, e.g., lengths, widths, depths, heights, thicknesses, or the like to accommodate different truck styles, truck frames, truck configurations, and/or the like. For example, heavy-duty trucks (e.g., ¾-ton or 1-ton trucks) may have wider and/or longer bed frames than smaller trucks (e.g., half-ton trucks or smaller), and the truck bed members 100 may be configured with dimensions/specifications for these truck types. In some embodiments, the width 128 of truck bed members 100 is between 7 inches and 9 inches. In certain embodiments, the width 128 of truck bed members 100 is 8.25 inches. In certain embodiments, the truck bed members 100 may be used to replace or convert beds for utility side-by-side vehicles (e.g., Polaris Ranger®), four-wheelers, and/or other off-road vehicles.

Figure 1B:
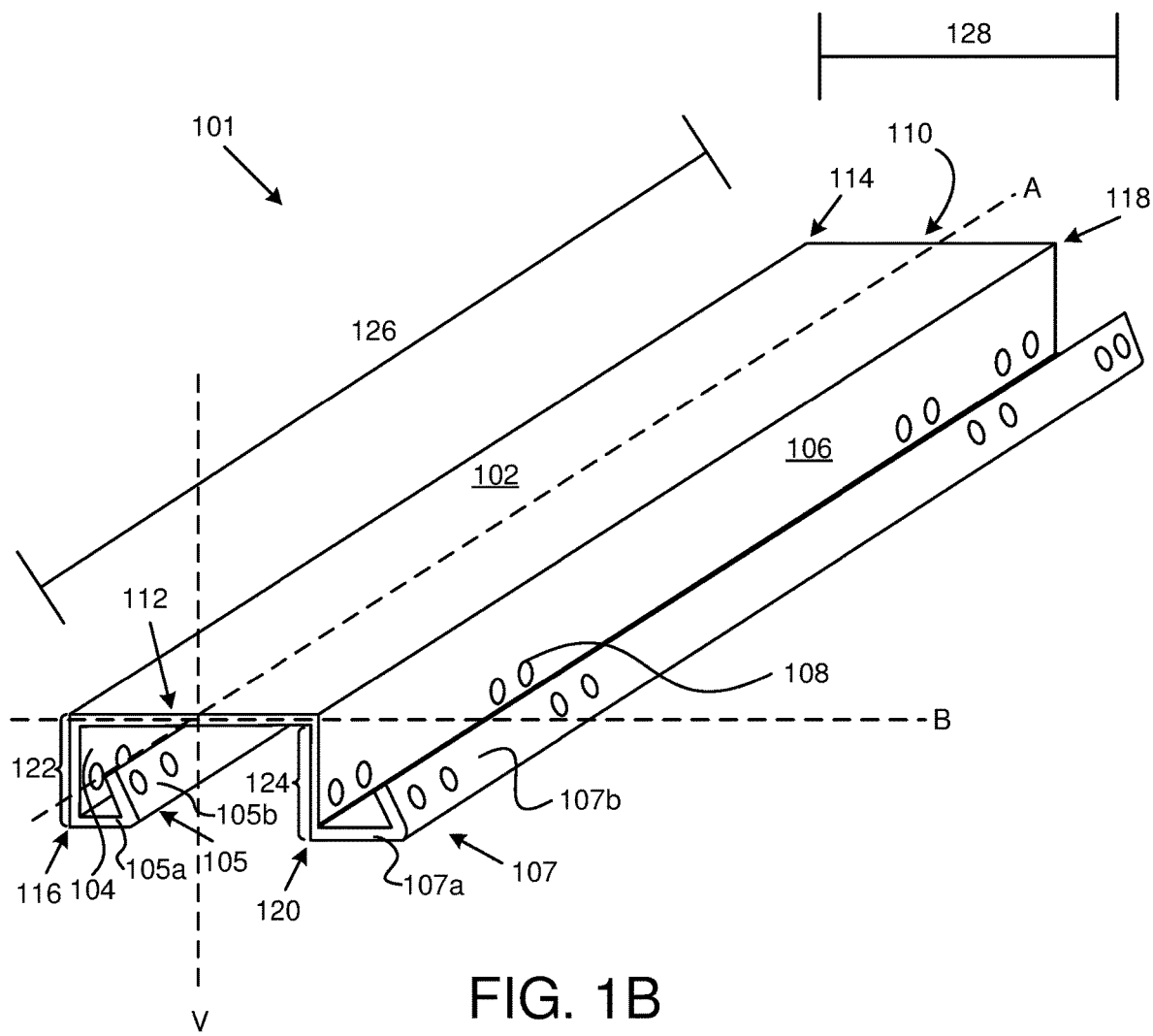
FIG. 1B is a perspective view illustrating one embodiment of a truck bed member of a modular truck bed with a J-shaped interlock for each truck bed member.

FIG. 1B is a perspective view illustrating one embodiment of a truck bed member 101 of a modular truck bed with a J-shaped interlock for each truck bed member 101. In the embodiment, the truck bed member 101 is substantially similar to the truck bed member 100 of FIG. 1A except the interlock receiving member 107 has a "J" shape that corresponds to the "J" shape of the interlocking member 105. In the embodiment, the interlock receiving member 107 includes a horizontal member 107a that is perpendicular to the edge 120 of the interlock receiving side 106 that is not fixed to the top side 102 and a vertical member 107b that is angled away from a vertical plane or axis V towards the interlock receiving side 106 such that movement of the interlocking member 105 is prevented in a vertical direction when the interlocking member 105 is inserted into the interlock receiving member 107. In this manner, a series of truck bed members 100 can be securely interlocked or connected to form a modular truck bed. Other shapes for the interlocking member 105 and interlock receiving member 107 could be used such as a "U" shape, a "C" shape, an "L" shape, or the like.

In certain embodiments, the interlocking member 105 of the interlocking side 104 has a "J" shape, or a backward "J" shape. In such an embodiment, the interlocking member 105 includes a horizontal member 105a that is perpendicular to the edge 116 of the interlocking side 104 that is not fixed to the top side 102 and a vertical member 105b that is angled away from a vertical plane or axis V towards the interlocking side 104.

The truck bed member 101 of FIG. 1B is one variation of the truck bed member 100 of FIG. 1A and other shaped truck bed members are possible with a different shaped interlocking member 105 and interlock receiving member 107. For simplicity, both truck bed members 100, 101 of FIGS. 1A and 1B are referenced as a truck bed member 100 or truck bed members 100.

In one embodiment, the truck bed member 100 includes a plurality of openings 108 in the interlocking side 104, the interlocking member 105, the interlock receiving side 106, and the interlock receiving member 107 for receiving fastening members that secure an interlocking member 105 of one truck bed member 100 to an interlock receiving member 107 of a different truck bed member 100. For instance, fasteners such as bolts, screws, nuts, or the like may be used to securely fasten, connect, or couple each of a series of interlocked truck bed members 100 to one another and/or to a truck bed substructure. In certain embodiments, a truck bed member 100 includes 4-12 openings 108 for securing truck bed members 100 to one another. In certain embodiments, a truck bed member 100 for a UTV or other small frame may include 3 openings. A truck bed member 100 may have up to 20 openings in certain embodiments.

In certain embodiments, the truck bed member 100 includes a plurality of openings (not shown) along the interlocking member 105 and/or the interlock receiving member 107 for securing the truck bed member 100 to a truck frame, a substructure between the truck bed member 100 and the truck frame, and/or the like. In such an embodiment, truck bed members 100 may be fastened, attached, secured, connected, or the like to the truck frame or substructure after the truck bed members 100 are interlocked or connected so that a fastener such as a bolt or screw can secure a pair of truck bed members 100 to the truck frame or substructure.

In one embodiment, the interlocking side 104 has a shorter vertical length 122 than the vertical length 124 of the interlock receiving side 106 such that when the interlocking member 105 of a truck bed member 100 is inserted into the interlock receiving member 107 of a different truck bed member 100, the top sides 102 of the truck bed members 100 are substantially flush along a horizontal plane or axis B.

In some embodiments, truck bed members 100 are made of a singular piece of material that is bent/formed into the desired configuration for a truck bed member 100. In certain embodiments, truck bed members 100 are comprised of different pieces of material that are welded, extruded, casted or otherwise connected to form a truck bed member 100. In certain embodiments, truck bed members 100 may include portions that are marked, pre-cut, or the like for installation of gooseneck hitches, drop hitches, fifth-wheel hitches, and/or the like.

Figure 2B:
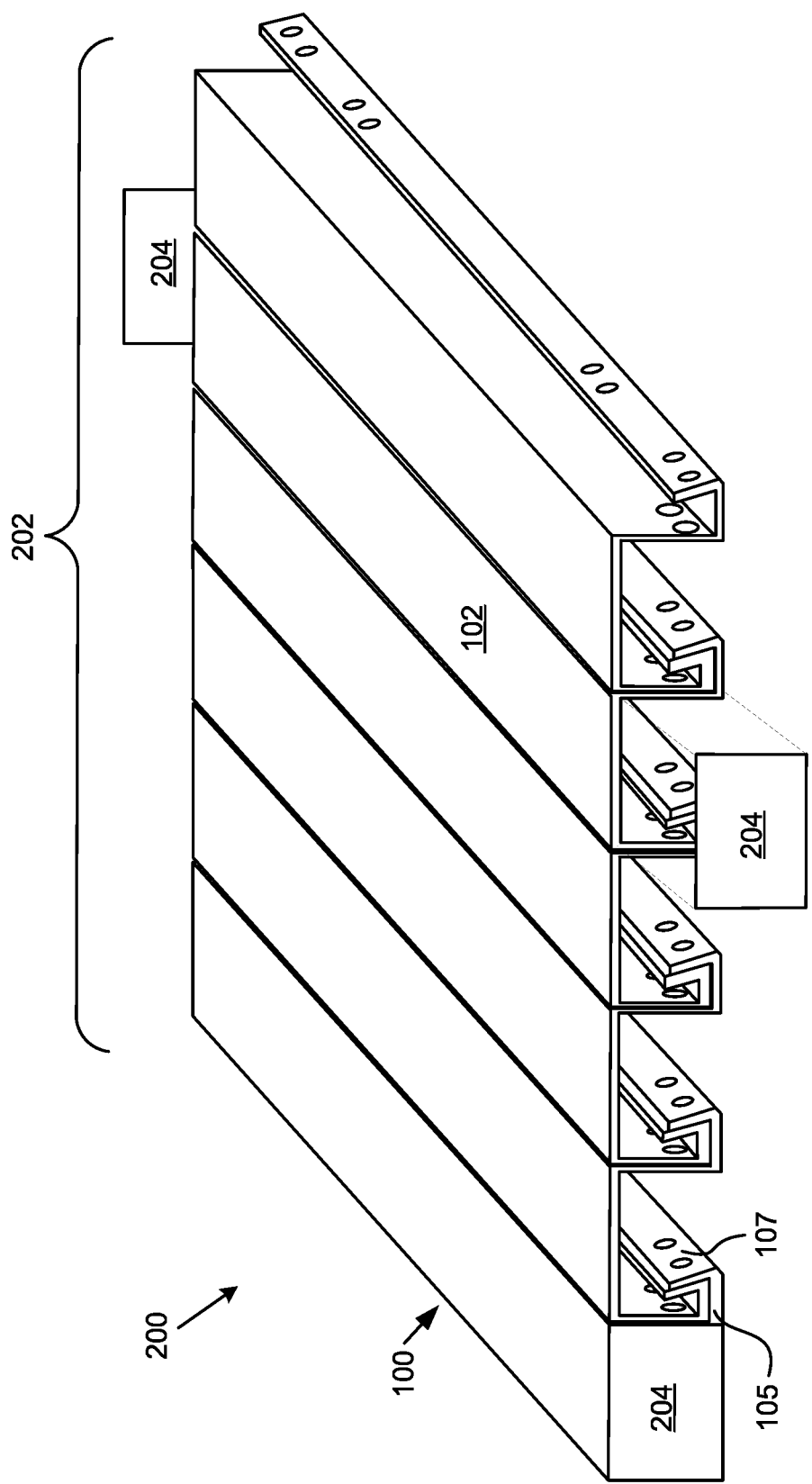
FIG. 2B is a perspective view illustrating one embodiment of a modular truck bed with a plurality of truck bed members depicted in FIG. 1B.

FIG. 2A is a perspective view illustrating one embodiment of a modular truck bed 200 with a plurality of truck bed members 100 depicted in FIG. 1A. FIG. 2B is a perspective view illustrating one embodiment of a modular truck bed 200 with a plurality of truck bed members 101 depicted in FIG. 1B. As shown in FIGS. 2A and 2B, the plurality 202 of truck bed members 100 are interlocked by inserting or sliding the interlocking member 105 of the truck bed members 100 into the corresponding interlock receiving member 107 of adjacent truck bed members 100 and/or further fastening or securing each truck bed member 100 to each other and/or to the truck frame using bolts, screws, etc.

In further embodiments, the truck bed members 100 may include end caps 204, end pieces, side panels, and/or the like that are fixed, attached, coupled, connected, or the like to the first end 110 and/or second end 112 of the truck bed members 100. In some embodiments, the end caps 204 are formed with the truck bed members 100. In certain embodiments, the end caps 204 are a continuation of the top side 102 material that is folded or bent over to cover the inner cavity of the truck bed member 100. In other embodiments, the end caps 204 are separate elements that can be fastened or coupled to the truck bed members 100 using bolts, screws, adhesives, welds, and/or the like. In certain embodiments, the end caps 204 include openings, hooks, slots, hoops, rings, or the like for attaching items/accessories such as tools, tie-downs, straps, chains, and/or the like.

Figure 3A:
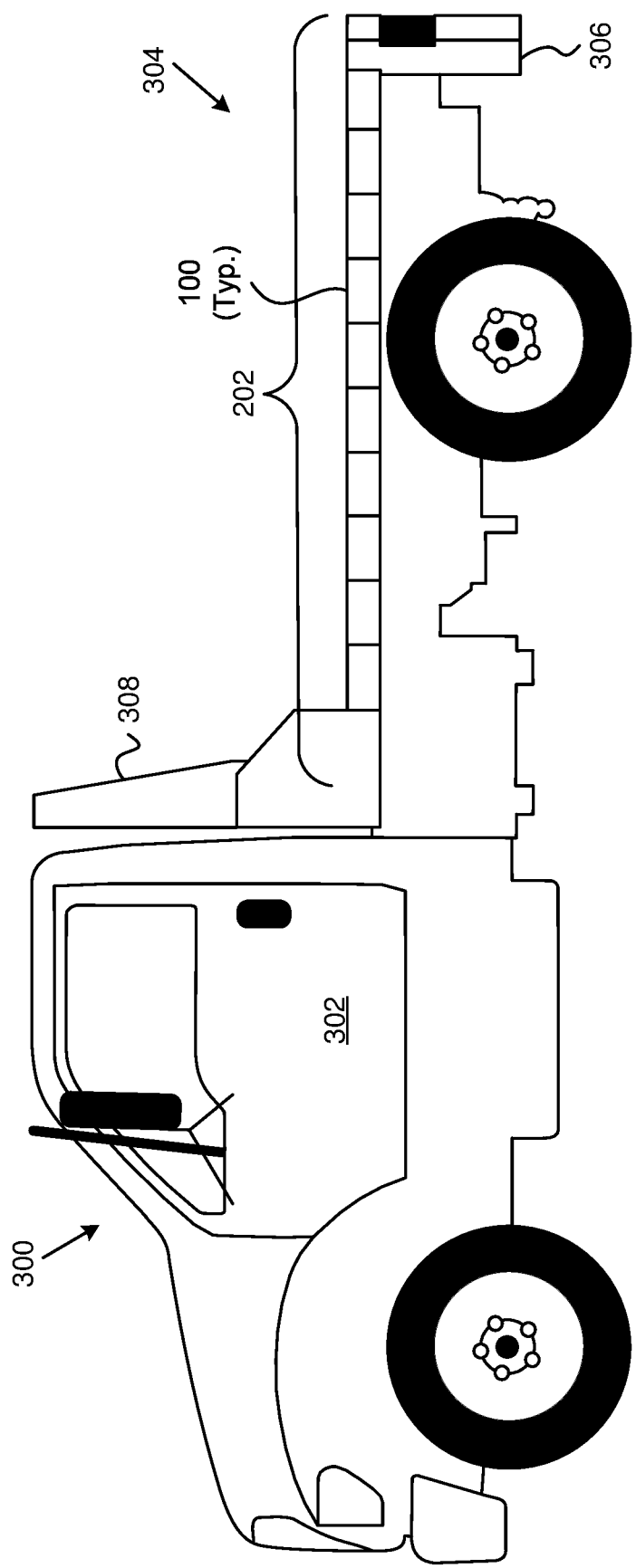
FIG. 3A is a side view illustrating one embodiment of a modular truck bed installed on a truck.
Figure 3B:
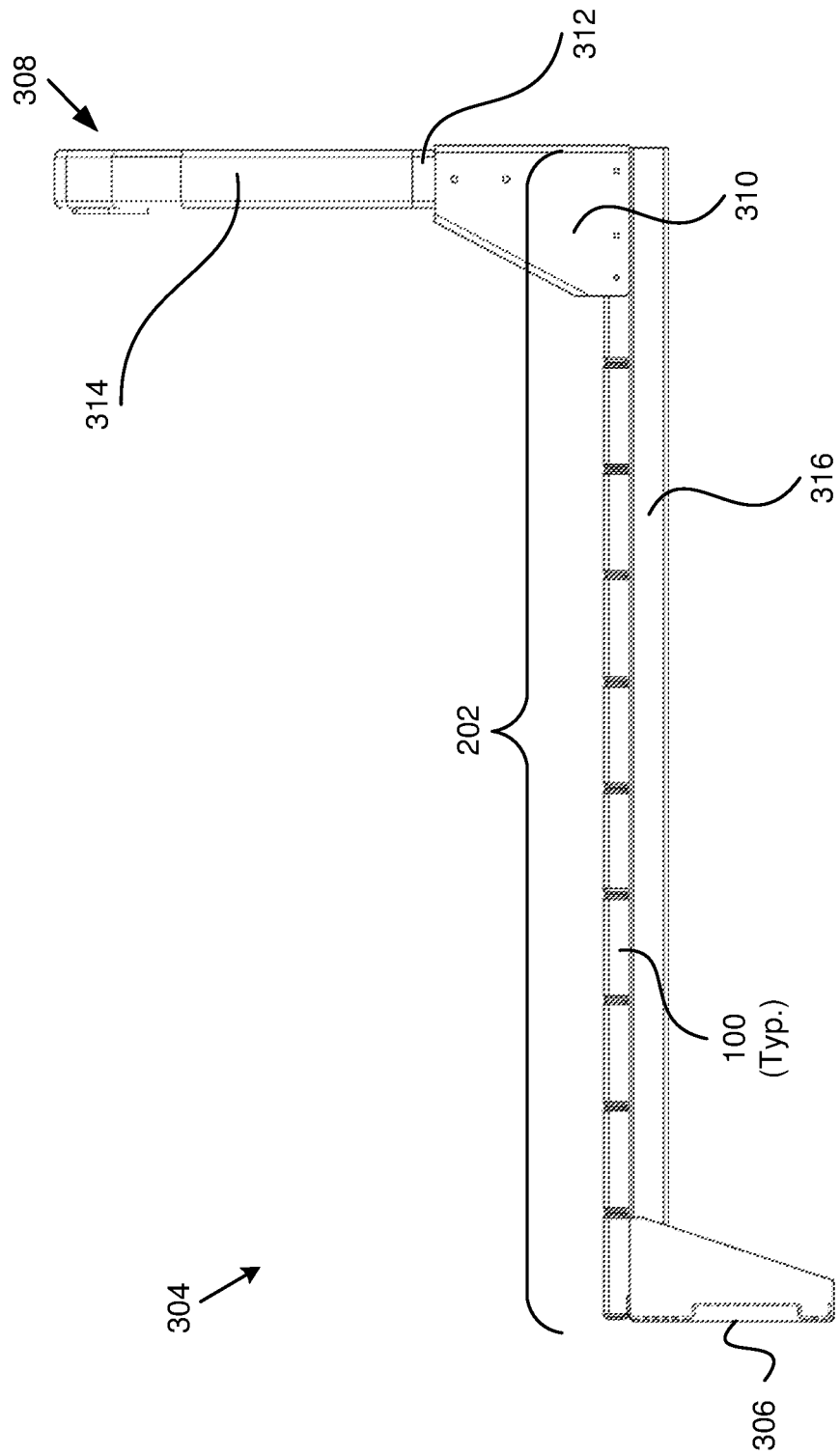
FIG. 3B is a side view illustrating another embodiment of a modular truck bed comprising truck bed members.

FIG. 3A is a side view illustrating one embodiment of a modular truck bed 304 installed on a truck 300. FIG. 3B is a side view illustrating another embodiment of a modular truck bed 200 with truck bed members 100 that is attachable to the truck 300. The modular truck bed 304 of FIG. 3B is substantially similar to the modular truck bed 304 of FIG. 3A with some variations to the headache rack 308 and tail assembly 306. In some embodiments, the modular truck bed 304 of FIGS. 3A and 3B is substantially similar to the modular truck bed 200 of FIG. 2A or 2B.

The truck 300 includes a truck cab 302 and has installed a plurality 202 of truck bed members 100 on the truck's frame at the rear of the truck 300 to form a flatbed. The modular truck bed 304 also includes a tail assembly 306 that interlocks into the last truck bed member 100 (the furthest rear member from the truck cab 302) of the plurality 202 of truck bed members 100 using bolts, nuts, etc. or connected with an interlocking member 105 that couples the tail assembly 306 to the last truck bed member 100. In certain embodiments, the tail assembly 306 includes wiring, lights, cameras (e.g., back-up cameras), a fuel neck filler, a diesel exhaust fluid ("DEF") filler and/or other components that integrate into the truck's electrical and/or fuel systems. The tail assembly 306 may be a single piece or may include two or more separate pieces that are fastened together (e.g., for packing and shipping purposes). Wiring, fuel lines, etc., in some embodiments, run through and/or adjacent to other components of the modular truck bed 200. In other embodiments, a DEF filler and/or fuel neck filler extend through an end cap of a truck bed member 100.

In further embodiments, the modular truck bed 200 further includes a headache rack 308. As used herein, a headache rack 308 is a strong, rigid wall-like structure placed at the front of a flatbed to protect the driver against shifting cargo, Headache racks 308 may also include hooks, rings, and/or other components for attaching tools, ropes, chains, straps, and/or the like. The headache rack 308 described herein may include an interlocking member 105 or an interlock receiving member 107 for coupling the headache rack 308 to the first truck bed member 100 of the plurality 202 of truck bed members 100. The headache rack 308 may further include a plurality of openings in the interlocking member 105/interlock receiving member 107 for securing or fastening the headache rack 308 to the modular truck bed 304 or substructure. In some embodiments, the headache rack 308 includes lights or other components and integrates with the truck's electrical system. In some embodiments, wiring runs through and/or adjacent to components of the headache rack 308 or other components of the modular truck bed 200.

In some embodiments, the headache rack 308 includes a front corner bracket 310 that connects to a vertical side portion of the headache rack 308 and to the truck bed members 100. Typically, the headache rack 308 includes a front corner bracket 310 on each side of the headache rack 308. In some embodiments, the headache rack 308 includes a lower section 312 and an upper section 314 where the upper section 314 slidably coupled to the lower section 312. A height of the headache rack 308 is adjustable by sliding the upper section 314 with respect to the lower section 312 and fixing the upper section 314 to the lower section 312 with fasteners to retain the upper section 314 at a desired height. In some examples, the lower section has U-shaped or tubular sides with an open top and the upper section 314 with U-shaped or tubular sides that fit within the sides of the lower section 312. In some embodiments, holes are pre-drilled in the upper section 314 and/or lower section 312 at different locations to secure the upper section 314 to the lower section 312 at a particular height. In other embodiments, the upper section 314 is slidably connected to the lower section 312 using rails, clips, or other way known to those of skill in the art.

The modular truck bed 304, as depicted in FIG. 3B includes a truck bed substructure 316 that connects to the truck bed members 100 and to the truck 300. In some embodiments, the truck bed members 100 connect directly to the truck 300, such as when the modular truck bed 304 acts as a bed liner. In other embodiments, the truck bed substructure 316 connects to the frame of the truck 300. In some embodiments, the truck bed substructure 316 includes one or more support members that run substantially perpendicular to the plurality 202 of truck bed members 100 within a plane that is parallel to the plane of the truck bed members 100. For example, the truck bed substructure 316 may include beams, such as I-beams, Z-beams, hollow-core beams, hitch assemblies, $5^{th}$ wheel hitch assemblies, rear tail sections, etc.

In some embodiments, the truck bed substructure 316 is flexible to accommodate variations in connections to the truck 300. In other embodiments, the truck bed substructure 316 is supplemented with shims, blocks, etc. to adjust for variations in connection points to the truck 300. In other embodiments, the truck bed substructure 316 includes notches to accommodate raised portions of the truck 300 where the modular truck bed 304 is connected. In other embodiments, the truck bed substructure 316 is customized to integrate with a specific model of a truck 300, a specific brand of truck 300, etc. Typically, the truck bed substructure 316 includes an upper surface that is planar for connection to the truck bed members 100. One of skill in the art will recognize other ways to provide a truck bed substructure 316 that adapts to a truck 300 and provide a surface for connection to the truck bed members 100.

Figure 3C:
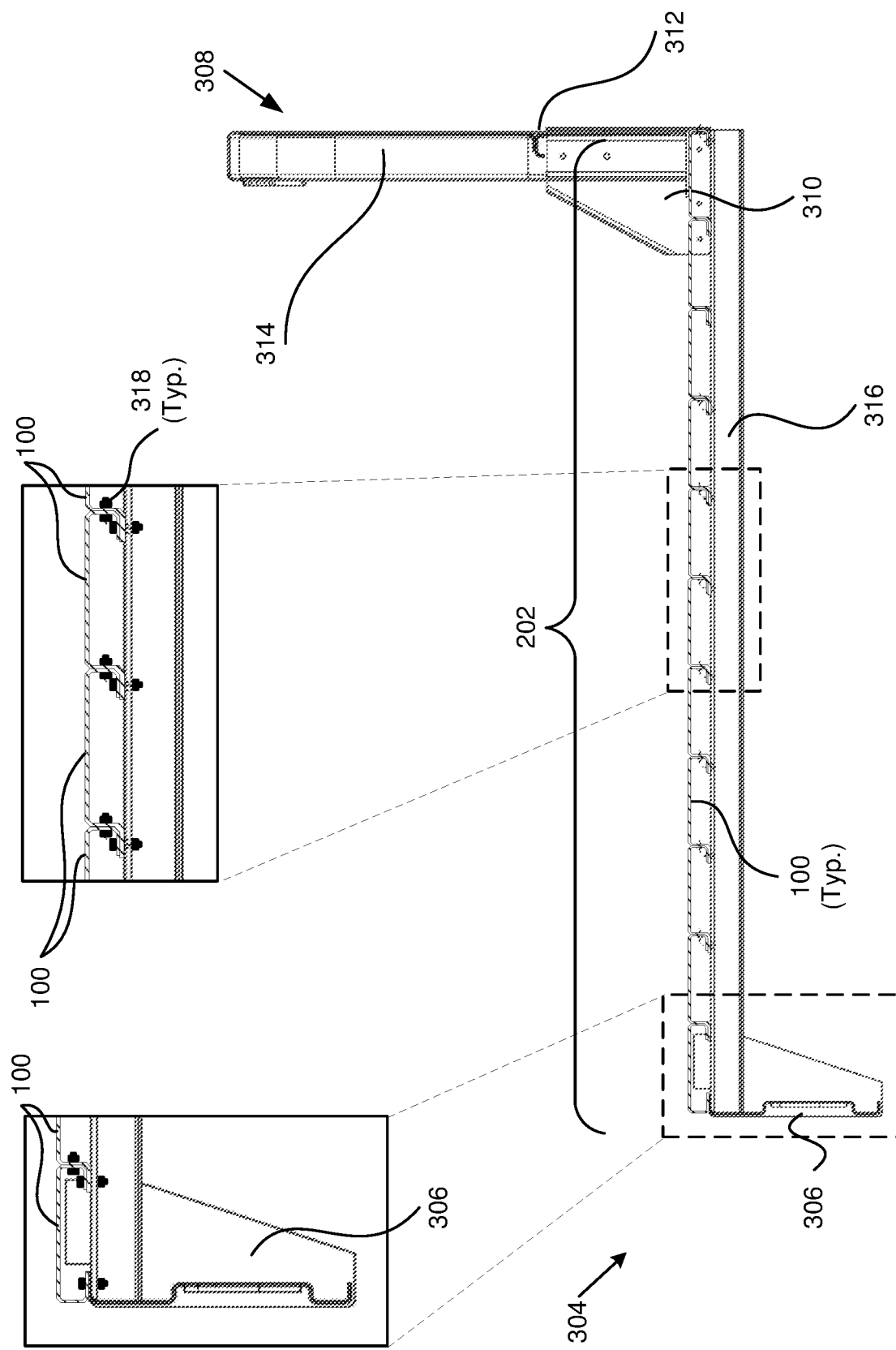
FIG. 3C is a side section view of the modular truck bed of FIG. 3B.

FIG. 3C is a side section view of the modular truck bed 304 of FIG. 3B. The side section is cut through the truck bed members 100, tail assembly 306 and headache rack 308 at an approximate location depicted in FIG. 4B (section A-A'). The upper boxes depict expanded sections of the modular truck bed 304 to display more detail. In various embodiments, the truck bed members 100 include openings 108 that accommodate fasteners 318 that connect the truck bed members 100 to each other and the to the truck bed substructure.

Figure 4A:
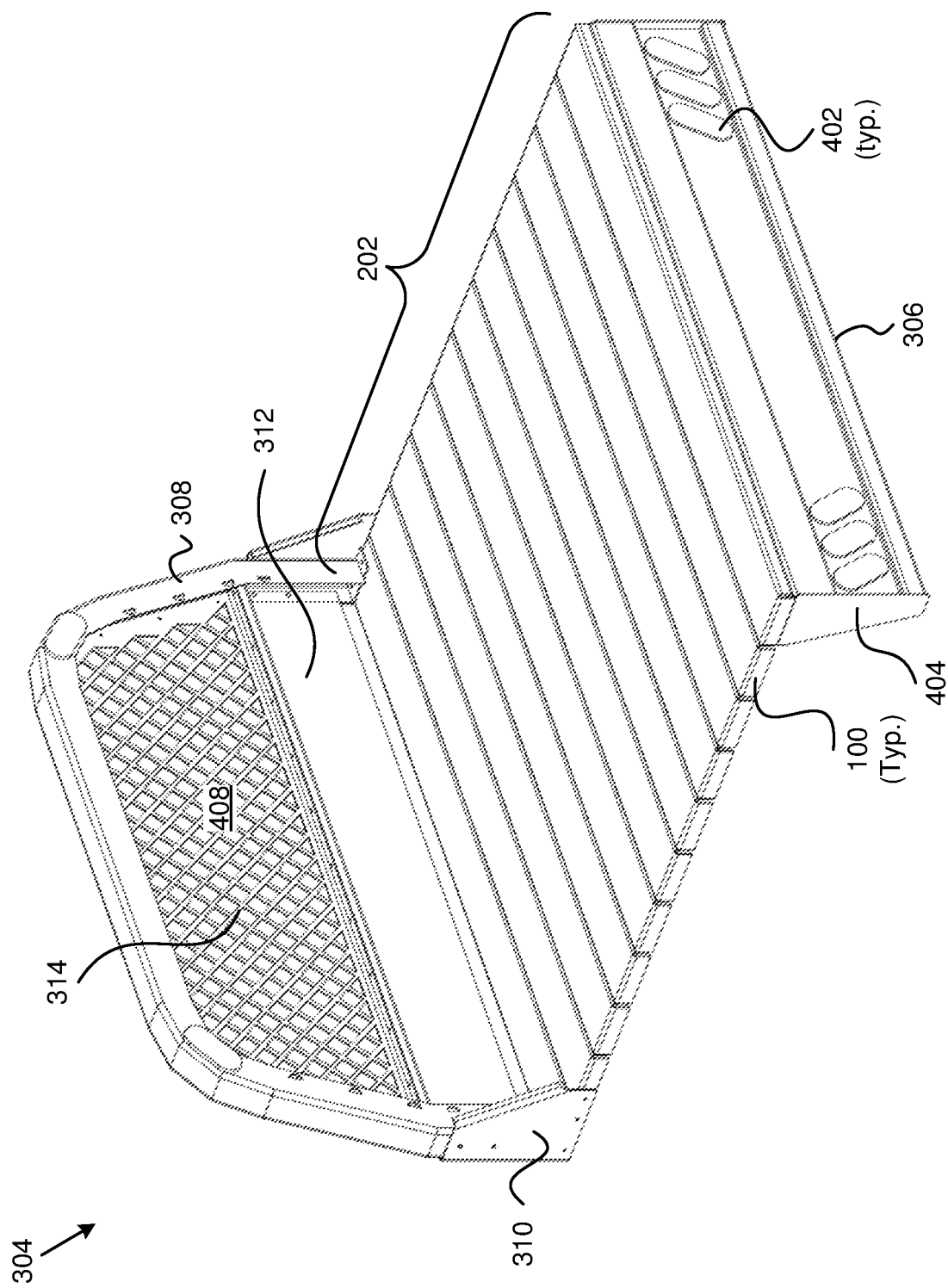
FIG. 4A is a perspective view of the modular truck bed of FIG. 3B.
Figure 4B:
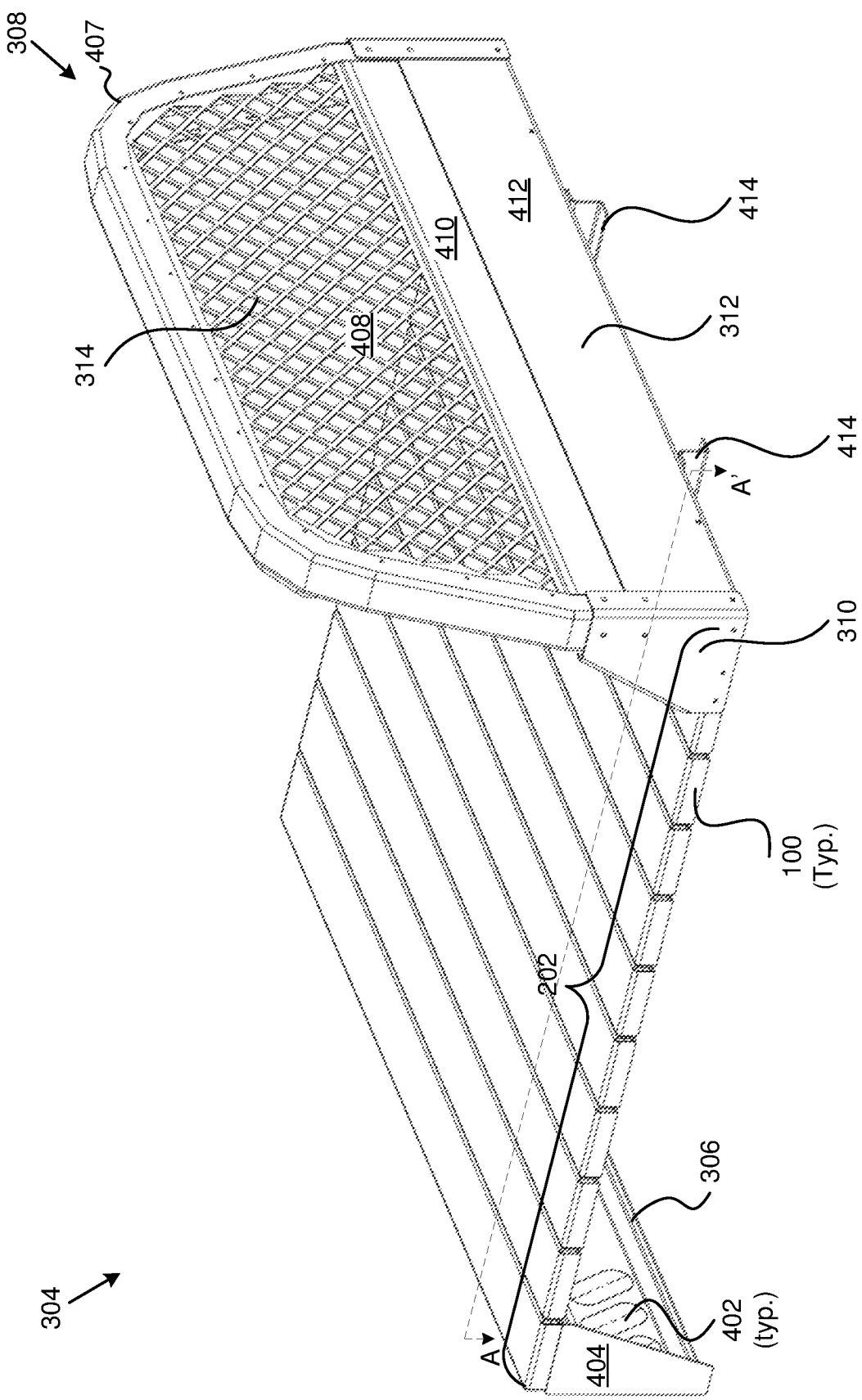
FIG. 4B is a different perspective view of the modular truck bed of FIG. 3B.

FIG. 4A is a perspective view of the modular truck bed 304 of FIG. 3B and FIG. 4B is a different perspective view of the modular truck bed 304 of FIG. 3B. FIG. 4A depicts the tail assembly 306 of the modular truck bed 304 with taillights 402 and may include other elements, such as a bumper, a backup camera, a license plate holder, a trailer hitch, a trailer hitch receiver, etc. In some embodiments, the tail assembly 306 also includes a rear panel side plate 404 that connects to sides of the tail assembly 306 and the truck bed members 100 and is shaped to provide support for the tail assembly 306. In some embodiments, the rear panel side plate 404 is rigid and may be steel, stainless steel, aluminum, aluminum extrusion, carbon fiber, etc.

The headache rack 308 is depicted with an upper section 314 that includes a lattice structure 408 with openings that are convenient for a driver of the truck 300 to see through and view traffic behind the truck 300. In other embodiments, the lattice structure 408 is replaced with bars, mesh, a solid plate, etc. In other embodiments, the lattice structure 408 is not included. FIG. 4B depicts the upper section 314 of the headache rack 308 with an arch structure 407, a lattice structure 408 at the top and a plate 410 at the bottom. The lower section 312 includes a plate 412 in front of the plate 410 of the upper section 314. In some embodiments, the plates 410, 412 overlap to allow for adjustment of the height of the upper section 314 without having a gap between the upper section 314 and the lower section 312. In other embodiments, the lower section 312 includes a substructure (not shown) within the side plate 310 and secured to the side plate 310 and/or bottom plate 412 for additional stability.

In the embodiment depicted in FIG. 4B, the truck bed substructure 316 includes two support members 414 that are in an "Z" configuration. The upper side of the support members 414 is flat to allow for connection to the truck bed members 100. The lower section of the support members 414 is flat for connection to the truck 300, such as to the frame of the truck 300. Other embodiments include other support member designs and/or truck bed substructure designs.

Figure 5A:
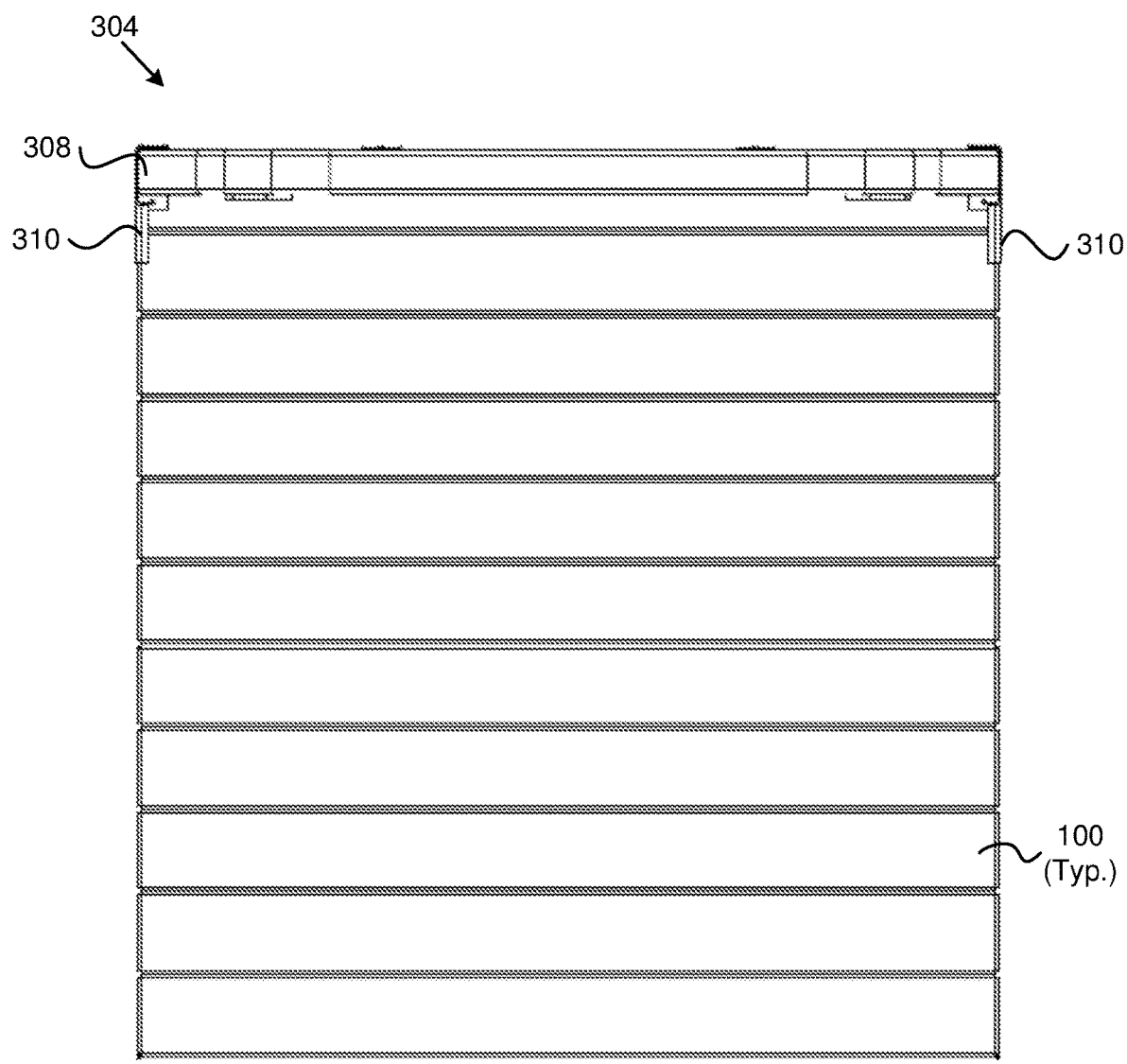
FIG. 5A is a top view illustrating the modular truck bed of FIG. 3B.
Figure 5B:
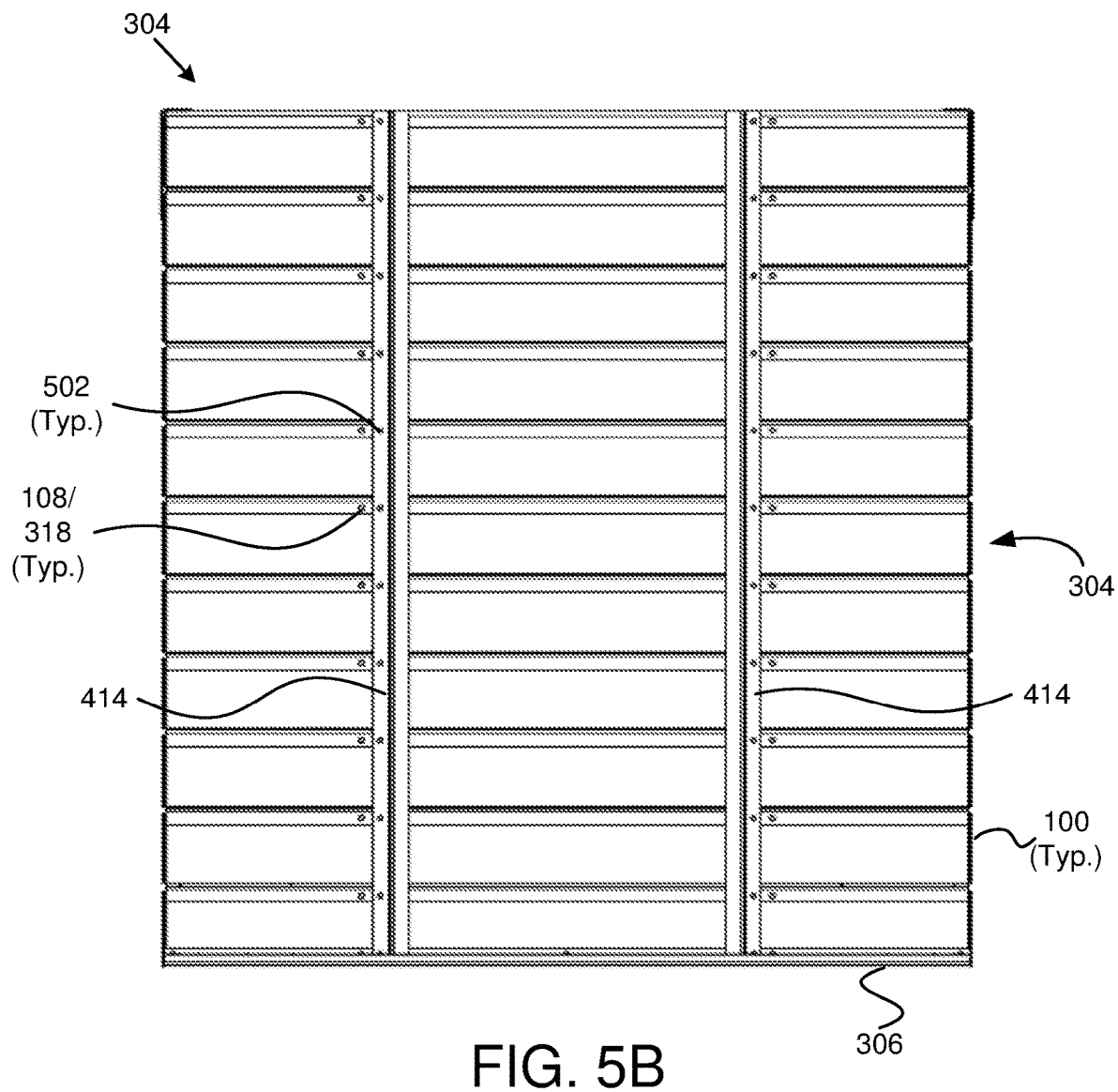
FIG. 5B is a bottom view illustrating the modular truck bed of FIG. 3B with a truck bed substructure.

FIG. 5A depicts a top view of the modular truck bed 304 and FIG. 5B is a bottom view illustrating the modular truck bed 304 of FIG. 3B with a truck bed substructure 316. The modular truck bed 304 includes a plurality of truck bed members 100. The modular truck bed also includes a truck bed substructure 316 that includes support members 414 installed between the truck bed members 100 and the truck frame. The truck bed substructure 316 in the depicted embodiment includes two separate support members 414 (e.g., beams) that are fastened, coupled, connected, or otherwise secured to the truck frame. Furthermore, the truck bed members 100 are fastened, coupled, connected, or otherwise secured to the truck bed substructure 316 instead of, or in addition to, being fastened to the truck frame directly. The truck bed substructure may have various shapes/configurations. For example, the truck bed substructure 316 may be one or more beams that run straight from the front to the rear of the truck bed, as depicted in FIG. 5B. The truck bed substructure 316 may also include members that have a "Z" shape, a "C" shape, an "I" shape, a square shape, a circular shape, and/or the like, and may be made of one piece or a plurality of pieces. In some embodiments, the truck bed substructure 316 is between 3-5 inches thick.

In such an embodiment, the truck bed substructure 316 provides openings 502 that include options/configurations for securing truck bed members 100 to the truck frame. Furthermore, the truck bed substructure 316 may include a flexible material, e.g., rubber, foam, or the like on an underside of the truck bed substructure 316 (e.g., the side that contacts the truck frame) to compensate for unevenness in the truck frame so that the top sides 102 of the truck bed members 100 are substantially flush within a horizontal plane when the truck bed members 100 are assembled and fastened to the truck bed substructure 316. In certain embodiments, the wiring for the tail assembly 306 may follow or be integrated with the truck bed substructure 316 and connect to corresponding wiring for the headache rack 308 to provide power for lights/accessories and sensors that are connected to the headache rack 308.

In some embodiments, truck bed members 100, the headache rack 308, and the tail assembly 306 are configured for packing and shipping as a modular truck bed system. In one embodiment, a plurality of truck bed members 100 are stacked on top of one another, with the headache rack 308 situated against the plurality of truck bed members 100, and the tail assembly 306 situated against the headache rack 308. In such an embodiment, the modular truck bed system can be packaged and shipped using a 2'×8' pallet.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A truck bed member, comprising:
   a top side having a substantially rectangular shape such that a length of the top side along a first axis from a first end to an opposing second end is greater than a width of the top side along a second axis perpendicular to the first axis;
   an interlocking side fixed perpendicular to the top side along a length of a first edge of the top side and parallel to the first axis, the interlocking side comprising an interlocking member along a length of an edge of the interlocking side opposite the edge of the interlocking side coupled to the top side;
   an interlock receiving side fixed perpendicular to the top side along a length of a second edge of the top side, the second edge opposite the first edge and parallel to the first axis, the interlocking side and the interlock receiving side are substantially parallel to one another and extending a same direction from the top side, the interlock receiving side comprising an interlock receiving member along a length of an edge of the interlock receiving side opposite the edge of the interlock receiving side coupled to the top side,
   wherein the interlocking member of the interlocking side is configured to selectively couple to the interlock receiving member of the interlock receiving side of a different truck bed member,
   wherein the interlocking member has a "J" shape comprising a horizontal member that is perpendicular to the edge of the interlocking side that is not fixed to the top side and a vertical member that is angled away from a vertical plane towards the interlocking side, and
   wherein the interlock receiving member has a "J" shape that corresponds to the "J" shape of the interlocking member comprising a horizontal member that is perpendicular to the edge of the interlock receiving side that is not fixed to the top side and a vertical member that is angled away from a vertical plane towards the interlock receiving side such that movement of the interlocking member is prevented in a vertical direction when the interlocking member is inserted into the interlock receiving member.

2. The truck bed member of claim 1, wherein the interlocking member extends in a direction parallel to the top side and in a direction toward the interlock receiving member and wherein the interlock receiving member extends in the direction parallel to the top side in a direction away from the interlocking member.

3. The truck bed member of claim 1, further comprising a plurality of openings in the interlocking side, the interlocking member, the interlock receiving side, and the interlock receiving member, the plurality of openings configured for receiving fastening members for securing an interlocking member of the truck bed member to an interlock receiving member of the different truck bed member.

4. The truck bed member of claim 1, wherein the interlocking side has a shorter vertical length than the interlock receiving side such that when the interlocking member of the truck bed member is inserted into the interlock receiving member of a different truck bed member the top sides of the truck bed members are substantially flush along a horizontal plane.

5. The truck bed member of claim 1, further comprising end caps fixed to the first and second ends, the interlocking side, and/or the interlock receiving side.

6. The truck bed member of claim 5, wherein each of the end caps comprise a plurality of openings positioned to fasten one or more attachments to the end cap with a fastener.

7. The truck bed member of claim 1, further comprising one or more openings along the interlocking member and the interlock receiving member positioned for securing the truck bed member to one of a truck frame and a substructure coupled to a truck frame.

8. The truck bed member of claim 1, wherein the truck bed member is made of a rigid material.

9. A modular truck bed system, comprising:
a plurality of truck bed members, each truck bed member comprising:
a top side having a substantially rectangular shape such that a length of the top side along a first axis from a first end to an opposing second end is greater than a width of the top side along a second axis perpendicular to the first axis;
an interlocking side fixed perpendicular to the top side along a length of a first edge of the top side and parallel to the first axis, the interlocking side comprising an interlocking member along a length of an edge of the interlocking side opposite the edge of the interlocking side coupled to the top side; and
an interlock receiving side fixed perpendicular to the top side along a length of a second edge of the top side, the second edge opposite the first edge and parallel to the first axis, the interlocking side and the interlock receiving side are substantially parallel to one another and extending a same direction from the top side, the interlock receiving side comprising an interlock receiving member along a length of an edge of the interlock receiving side opposite the edge of the interlock receiving side coupled to the top side, wherein the interlocking member of the interlocking side is configured to selectively couple to the interlock receiving member of the interlock receiving side of a different truck bed member of the plurality of truck bed members; and
a plurality of openings in the interlocking side, the interlocking member, the interlock receiving side, and the interlock receiving member, the plurality of openings configured for receiving fastening members for securing an interlocking member of the truck bed member to an interlock receiving member of the different truck bed member; and
a truck bed substructure,
wherein the plurality of truck bed members are coupled to one another and to the truck bed substructure.

10. The modular truck bed system of claim 9, wherein the truck bed substructure is couplable to a truck behind a cab of the truck to form a truck bed, each of the plurality of truck bed members fastened to the truck bed substructure.

11. The modular truck bed system of claim 10, wherein the truck bed substructure comprises one or more support members that run substantially perpendicular to the plurality of truck bed members within a plane that is parallel to the plane of the truck bed members.

12. The modular truck bed system of claim 10, wherein the truck bed substructure comprises flexible material to compensate for unevenness of a truck frame of the truck such that the top sides of the plurality of truck bed members, when assembled and fastened to the substructure, are substantially flush within a horizontal plane.

13. The modular truck bed system of claim 9, further comprising a tail assembly configured to couple to a last truck bed member positioned at an end of the truck bed members distal to a cab of the truck.

14. The modular truck bed system of claim 13, wherein the tail assembly comprises wiring and lights that integrate into an electrical system for a truck comprising the truck bed.

15. The modular truck bed system of claim 9, further comprising a headache rack configured to couple to a first truck bed member positioned at an end of a truck bed members adjacent to a cab of the truck.

16. The modular truck bed system of claim 15, wherein the headache rack comprises an upper section slidably coupled to a lower section, wherein a height of the headache rack is adjustable by sliding the upper section with respect to the lower section and fixing the upper section to the lower section with fasteners to retain the upper section at a desired height.

17. The modular truck bed system of claim 9, further comprising one or more side panels and/or accessories that are configured to couple to ends of the truck bed members.

18. The modular truck bed system of claim 9, wherein the plurality of truck bed members comprises an end truck bed member, the end truck bed member comprising an interlocking member extending parallel to the top surface and toward the interlock receiving member.

19. The modular truck bed system of claim 9, wherein:
the interlocking member has a "J" shape comprising a horizontal member that is perpendicular to the edge of the interlocking side that is not fixed to the top side and a vertical member that is angled away from a vertical plane towards the interlocking side, and
the interlock receiving member has a "J" shape that corresponds to the "J" shape of the interlocking member comprising a horizontal member that is perpendicular to the edge of the interlock receiving side that is not fixed to the top side and a vertical member that is angled away from a vertical plane towards the interlock receiving side such that movement of the interlocking member is prevented in a vertical direction when the interlocking member is inserted into the interlock receiving member.

20. A modular truck bed system, comprising:
a plurality of truck bed members, each truck bed member comprising:
a top side having a substantially rectangular shape such that a length of the top side along a first axis from a first end to an opposing second end is greater than a width of the top side along a second axis perpendicular to the first axis;

an interlocking side fixed perpendicular to the top side along a length of a first edge of the top side and parallel to the first axis, the interlocking side comprising an interlocking member along a length of an edge of the interlocking side opposite the edge of the interlocking side coupled to the top side;

an interlock receiving side fixed perpendicular to the top side along a length of a second edge of the top side, the second edge opposite the first edge and parallel to the first axis, the interlocking side and the interlock receiving side are substantially parallel to one another and extending a same direction from the top side, the interlock receiving side comprising an interlock receiving member along a length of an edge of the interlock receiving side opposite the edge of the interlock receiving side coupled to the top side, wherein the interlocking member of the interlocking side is configured to selectively couple to the interlock receiving member of the interlock receiving side of a different truck bed member of the plurality of truck bed members, wherein the interlocking member has a "J" shape comprising a horizontal member that is perpendicular to the edge of the interlocking side that is not fixed to the top side and a vertical member that is angled away from a vertical plane towards the interlocking side, and wherein the interlock receiving member has a "J" shape that corresponds to the "J" shape of the interlocking member comprising a horizontal member that is perpendicular to the edge of the interlock receiving side that is not fixed to the top side and a vertical member that is angled away from a vertical plane towards the interlock receiving side such that movement of the interlocking member is prevented in a vertical direction when the interlocking member is inserted into the interlock receiving member;

a truck bed substructure comprising two support members that run substantially perpendicular to the plurality of truck bed members within a plane that is parallel to the plane of the truck bed members;

a tail assembly shaped to couple to a last truck bed member positioned at an end of the truck bed members distal to a cab of the truck; and a headache rack shaped to couple to a first truck bed member positioned at an end of a truck bed members adjacent to a cab of the truck, wherein the plurality of truck bed members are couplable to one another, to the truck bed substructure, to the tail assembly and to the headache rack.

\* \* \* \* \*